United States Patent [19]

Nyfeler et al.

[11] Patent Number: 4,556,378
[45] Date of Patent: Dec. 3, 1985

[54] APPARATUS FOR EMBOSSING HIGH RESOLUTION RELIEF PATTERNS

[75] Inventors: Alex Nyfeler, Baar; Peter Gehr, Cham; Martin Stalder, Baar; Gregor Antes, Zürich, all of Switzerland

[73] Assignee: LGZ Landis & Gyr Zug AG, Zug, Switzerland

[21] Appl. No.: 650,900

[22] Filed: Sep. 14, 1984

[30] Foreign Application Priority Data

Sep. 19, 1983 [CH] Switzerland .................. 5072/83

[51] Int. Cl.$^4$ ..................... B29C 17/00; G02B 5/00
[52] U.S. Cl. ............................ 425/143; 425/149; 425/385; 264/1.3
[58] Field of Search ............... 425/385, 143, 149; 264/1.3, 175, 220

[56] References Cited

U.S. PATENT DOCUMENTS

| | | | |
|---|---|---|---|
| 2,609,568 | 9/1952 | Getchell | 425/385 X |
| 2,928,124 | 3/1960 | Hugger | 425/385 X |
| 3,107,394 | 10/1963 | Varon | 425/385 X |
| 3,565,978 | 2/1971 | Folger et al. | 264/1.3 |
| 3,603,668 | 9/1971 | De Bitetto | 264/1.3 X |
| 3,619,024 | 11/1971 | Frattarola | 264/1.3 X |
| 3,680,945 | 8/1972 | Sheridan | 264/1.3 X |
| 3,758,649 | 9/1973 | Frattarola | 425/1.3 |
| 3,882,207 | 5/1975 | Hannon et al. | 264/1.3 X |
| 4,142,849 | 3/1979 | Lewicki et al. | 425/385 |
| 4,211,743 | 7/1980 | Nauta et al. | 425/385 X |

FOREIGN PATENT DOCUMENTS

| | | |
|---|---|---|
| 79263 | 5/1983 | European Pat. Off. . |
| 2184959 | 12/1973 | France . |
| 2401484 | 3/1979 | France . |

*Primary Examiner*—J. Howard Flint, Jr.
*Attorney, Agent, or Firm*—Marmorek, Guttman & Rubenstein

[57] ABSTRACT

An apparatus for embossing a high resolution relief pattern such as a phase hologram or diffraction grating from a mold onto a thermoplastic material is disclosed.

The apparatus comprises first and second adjacent disks adapted to rotate in opposite senses, the disks serving to define an embossing zone therebetween in which the circumferences of the disks exert pressure on one another. The first disk serves to transport the thermoplastic material to the embossing zone. To preheat the thermoplastic material, a preheating band of limited length is mounted under tension on the circumference of the first disk, the preheating band being resistively heated by a longitudinally flowing electric current. A resistively heated band-shaped embossing mold is mounted on the circumference of the second disk. The embossing mold and the thermoplastic carrier come into contact with one another in the embossing zone. The pressure exerted by the disks on one another in the embossing zone is sufficient to transfer the relief pattern from the heated mold to the heated thermoplastic material. A mechanism for controlling the embossing pressure is provided.

14 Claims, 4 Drawing Figures

APPARATUS FOR EMBOSSING HIGH RESOLUTION RELIEF PATTERNS

FIELD OF INVENTION

This invention relates to an apparatus for embossing a high resolution relief pattern such as a phase hologram or a diffraction grating onto a thermoplastic information carrier.

BACKGROUND OF THE INVENTION

Information may be stored on thermoplastic carrier material in the form of high resolution relief patterns such as phase holograms or diffraction gratings. The thermoplastic carrier material may be in the form of a card, tape, or sheet. The embossed relief pattern, which illustratively includes video information or authenticity information, may be read using available optical devices.

An apparatus for embossing holograms onto a thermoplastic carrier is disclosed in U.S. Pat. No. 3,758,649. this apparatus, an embossing mold,formed as an endless belt, and a thermoplastic information carrier are jointly passed between two calender rollers, one of which is heated. The thermoplastic carrier is heated to a sufficient temperature so that the relief pattern carried by the mold is transferred to the thermoplastic information carrier.

Another apparatus for embossing high resolution relief patterns onto a thermoplastic material is disclosed in U.S Pat. No. 4,125,760. U.S. Pat. No. 4,125,760 also discloses an embossing mold shaped as an endless belt, which embossing mold is passed through a pair of rollers along with the thermoplastic carrier material.

U.S. Pat. No. 3,855,025 discloses an arrangement in which thermoplastic tape is passed around a heating cylinder having a heating band mounted under tension thereon.

It is an object of the present invention to provide an improved apparatus for embossing high resolution relief patterns onto thermoplastic carrier materials. More particularly, it is an object of the present invention to provide an embossing apparatus which permits the achievement of relatively high working speeds while minimizing distortions in the embossed relief patterns which would prevent the recovery of information to be stored in the relief patterns.

SUMMARY OF THE INVENTION

In a preferred embodiment, an apparatus for embossing a high resolution relief pattern from a mold onto a thermoplastic information carrier comprises first and second adjacent disks adapted to rotate in opposite senses about first and second adjacent axes. The disks serve to define an embossing zone therebetween in which the circumferences of the disks exert pressure on one another. The first disk serves to transport the information carrier to the embossing zone. To pre-heat the thermoplastic material, a a preheating band is mounted under tension on the surface of the first disk, the preheating being resistively heated by a longitudinally flowing electric current. Fixedly mounted on the second disk is a band-shaped embossing mold. The band-shaped embossing mold also may be resistively heated by a longitudinally flowing electric current. The thermoplastic carrier and the embossing mold come into contact with one another in the embossing zone. The pressure exerted by the first and second disks on one another in the embossing zone is sufficient to transfer the relief pattern from the heated mold to the heated thermoplastic material. A mechanism for controlling the embossing pressure is provided.

The apparatus of the present invention has distinct advantages over prior art embossing devices. The use of an endless belt to carry the embossing mold is eliminated and no endless belt is required to heat the thermoplastic carrier material. Instead, a band-shaped embossing mold of limited length is fixedly mounted on the surface of a disk. Similarly, a heating band of limited length is mounted on the surface of another disk to heat the thermoplastic carrier material. Such a system is extremely easy to control.

In addition, the apparatus is especially suited for embossing a plurality of very narrow relief patterns side-by-side on a thermoplastic information carrier. Such embossing may be accomplished with a minimum of distortion so that information to be stored in the relief pattern is not lost.

For purposes of clarity the Figures have not been drawn to scale.

DETAILED DESCRIPTION OF THE INVENTION

Figure 1:
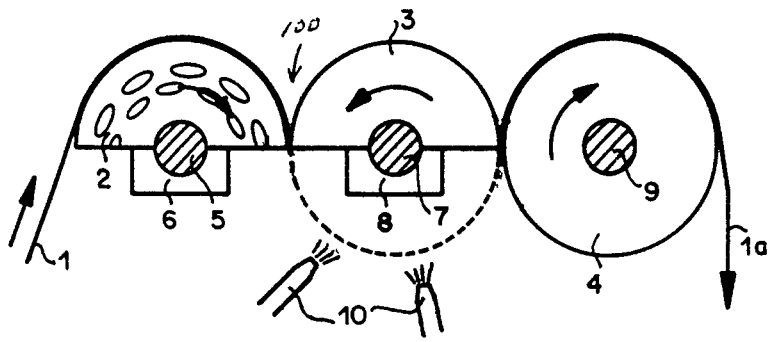
FIG. 1 shows an apparatus for embossing high resolution relief patterns onto a thermoplastic material,in accordance with an illustrative embodiment of the invention.

Referring to FIG. 1, the apparatus for embossing high resolution relief patterns comprises semi-circular preheating disk 2 and semi-circular mold disk 3. The disks 2 and 3 are rotatable in opposite senses, the disk 2 rotating clockwise about the axis 5 and the disk 3 rotating counterclockwise about the axis 7. The mold disk 3 is affixed to the axis 7 by means of a tightening lever 8. A similar tightening lever is used to affix the preheating disk 2 to the axis 5. The disks 2 and 3 define an embossing zone 100 therebetween in which the disks 2 and 3 exert pressure on one another.

Figure 2:
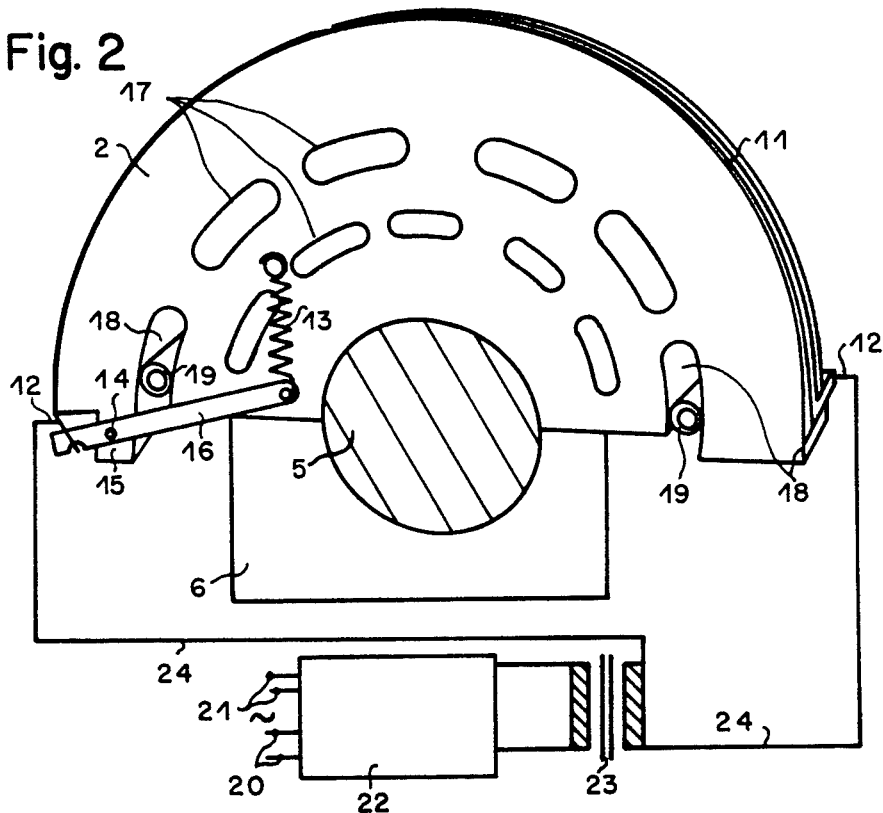
FIG. 2 shows a disk used for preheating the thermoplastic carrier material,in accordance with an illustrative embodiment of the invention.

The information carrier 1, which illustratively comprises a thermoplastic material mounted on a rough substrate such as paper, is continuously fed onto the preheating disk 2 by a feeding device (not shown). The disk 2 which is typically formed from a material that is both thermally and electrically insulating, may be semi-circular in shape as shown in FIG. 1 or circular in shape. In either case, the disk 2 should have a thickness on the order of at least 1 cm. In order to preheat the information carrier 1, one or several preheating bands are mounted, under tension, onto the surface of preheating disk 2, these belts having a limited length and a smooth surface. One such belt 11 is illustrated in FIG. 2. Additional preheating belts may be mounted on the surface of the preheating disk 2 parallel to the belt 11.

In a particular embodiment of the invention, the information carrier 1 is provided with a thermoplastic layer arranged in one or several narrow strips. Illustratively, each strip has a width of about 10 mm, in a field having about a 100 mm width. A corresponding number of preheating disks 2 is arranged on axis 5, the preheating bands of which are preheated to a precisely predetermined temperature of, for example, 150°±1° C., so that the information carrier can be heated before entering the embossing zone. The preheating bands are resistively heated by longitudinally flowing electric currents.

The mold disk 3 is similar to the preheating disk 2, with the exception that on its circumference there is affixed one or more band-shaped molding elements which carry an imprint of the negative of the relief pattern to be embossed on the information carrier. The band-shaped molding elements are also resistively heated by a longitudinally flowing electric current. When the preheating disk 2 and the molding disk 3 are rotated in opposite senses, the thermoplastic information carrier 1 and the band-shaped embossing mold come into contact with each other in the embossing zone 100. In the embossing zone 100 the pressure exerted by the disks 2 and 3 on one another causes the pattern carried by the mold to be embossed on the thermoplastic carrier material. Upon leaving the embossing zone 100, the information carrier 1, which by now is provided with the embossed relief pattern, is precooled by way of the cooling jets 10. This serves to fix the relief pattern on the information carrier. Grips (not shown) serve to separate the information carrier from the embossing mold. The information carrier 1 is then transported to the cooling cylinder 4, which preferably comprises a water-cooled calender, where it is completely cooled off. The cooled-off information carrier 1a is caught in a vessel as it leaves the cooling cylinder 4.

Fig. 2 shows an embodiment of the preheating disk 2 in a semi-perspective view. The preheating disk 2 is semi-circular in shape and is rotatable about axis 5. The disk is provided with a single preheating band 11 on its circumference. At one end, the preheating band 11 is stretched by a tensioning lever 16, which lever is rotatable about the axis 14 of projection 15 of the preheating disk 2. The preheating band 11 is tightly tensioned at its other end. The preheating band 11 is preferably mounted in a groove formed in the surface of the semi-circular disk 2, which groove is not quite as deep as the thickness of the preheating band 11 so that the preheating band 11 protrudes therefrom. Constant tensioning of the preheating band 11 in the groove of the preheating disk 2 may be aided by lubricating the groove with graphite or molybdenum sulfide, which increases the life span of the band.

The preheating disk 2 is provided with oval-shaped openings 17. Preferably, at least some of the openings 17 are located close to the disk edge. The openings 17 lend a well-defined elasticity to the preheating disk 2 and also improve the thermal insulation of axis 5. It may also be possible to achieve an increase in the elasticity of the preheating disk 2 by inserting a rubber layer between the same and its axis 5. In another embodiment of the preheating disk 2 that has not been illustrated, the preheating band 11 may be affixed to an elastic layer glued onto the circumference of the preheating disk 2.

In order to maintain the embossing zone pressure between disks 2 and 3 at a uniform level throughout the whole trajectory of revolution of disks 2 and 3, supporting elements 19 are arranged in the slits 18 on the semi-circular disk ends. Supporting elements 19 prevent a reduction in embossing zone pressure, as the end positions of the semi-circular disks enter the embossing zone 100.

To further ensure that all segments of the rotating disk 2 are subject to the same embossing pressure, the manufacturing tolerances for the diameter of the preheating disk 2 and the thickness of the preheating band 11 are kept within narrow limits. Uneven thermal distension of the preheating disk 2 and sagging (bending) of the axis 5 may be compensated for by the openings 17 which endow the preheating disk with a predetermined elasticity. The molding disk 3 of FIG. 1 may be formed with or without the openings 17. But it is desirable that at least one of the two be provided with openings 17.

The preheating band 11 may be resistively heated by a longitudinally flowing electric current. Resistive heating of the preheating band 11 is effected by means of the regulator 22, which regulator is provided with connectors 20 and 21. The connectors 20 are intended to connect the regulator 22 with a power-supply system. The connectors 21 are connected to a temperature sensor (not shown) that is in thermal communication with the preheating band 11. The output of the regulator 22 is connected to the primary winding of a transformer 23. The secondary winding 24 of the transformer 23 is connected to the connectors 12 of the preheating band 11. More particularly, the secondary winding 24 of the transformer 23 is linked to sliding rings 33, 34 arranged on axis 5, which sliding rings are in electrical communication with the connectors 12 (See FIG. 4).

By means of the temperature sensor (not shown), that is in thermal communication with the preheating band 11, a signal corresponding to the temperature sensed is transmitted to the regulator 22 by way of connectors 21. In response to the signal from the temperature sensor, the regulator 22 transmits to the transformer 23 a voltage of such magnitude and form that the preheating band is rapidly heated up (for instance in 10 seconds) to a predetermined temperature (e.g. 150 degrees centigrade) and is then maintained at the predetermined temperature. Heating is accomplished so rapidly that the temperature is kept constant independent of the embossing speed. For this reason, the preheating band 11 possesses a reduced thickness, for instance 0.3 mm, and thus a reduced specific heat. It may, for instance, comprise non-rusting steel so that the heating will not lead to oxidation of the surface. The flow of heat from the preheating band 11 to the axis 5 of the disk 2 is prevented to a large degree by the openings 17 in the disk 2. The openings 17 serve to thermally insulate the circumference of the disk 2 from its axis. Preferably the temperature sensor for sensing the temperature of the preheating band 11 is embedded in the preheating disk 2 in a manner which permits the preheating band 11 to slide over the temperature sensor when the preheating band 11 is under thermal tension.

In order to keep the preheating band 11 in a tensioned state at any temperature so that the preheating band 11 is in constant contact with the information carrier 1, the preheating band 11 is pre-tensioned by the arrangement that comprises the spring 13 and the tensioning lever 16.

The temperature of the embossing mold is easily controlled by an additional regulator (not shown). The additional regulator is coupled to the embossing mold in such a way that the temperature of the embossing mold unfolds optimally during the embossing operation.

To review briefly, during the embossing process information is transferred from the negative relief design of the band-shaped embossing mold mounted on the molding disk 3 of FIG. 1 to the thermoplastic layer of the information carrier 1 of FIG. 1. Prior to entering the embossing zone 100, the thermoplastic material is preheated on the preheating disk 2 beyond its softening point. After leaving the embossing zone, the thermoplastic carrier 1 is fixed in a cooling zone 101 by means of the cooling jets 10.

Figure 3:
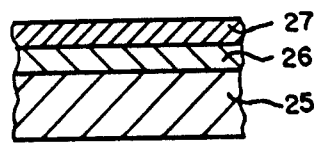
FIG. 3 shows an embossing mold arrangement for use in connection with the apparatus of Fig. 1,in accordance with an illustrative embodiment of the invention.

In order to ensure the optimal copying of the mold profile onto the thermoplastic layer, a well-defined temperature and pressure cycle must unfold in a predetermined time span in the embossing zone 100 and cooling zone 101. First the thermoplastic material to be embossed is heated up beyond its softening temperature. The relief pattern is then embossed onto the thermoplastic material in the high pressure embossing zone 100. The thermoplastic material is cooled off while it is in contact with the mold, following which the information carrier 1 and the mold are separated. For the embossing of a high resolution relief pattarn, a mold whose temperature has been kept substantially below the softening temperature of the thermoplastic material will not yield optimal results. This can be attributed to the fact that the embossing pressure exerted on a given location on the surface of the disk 2 does not occur instantaneously but builds up only gradually as the given location moves into and through the embossing zone 100. Thus, if the mold is relatively cool, the preheated thermoplastic material will start to cool off as soon as it comes into contact with the mold, before the embossing process is complete. When the outer portion of the thermoplastic material is cooled-off prematurely, before it can plastically deform itself and adjust to the mold profile and all its structural details, a crust will be formed. Possibly the crust results from elastic deformation of the prematurely cooled outer portion of the thermoplastic carrier material. Such crust formation diminishes the embossing precision and may result in a loss of information to be stored by the embossed relief pattern. In addition a relatively cool mold may result in a premature separation of the mold and information carrier. These problems can be considerably reduced, if the embossing mold is formed as shown in FIG. 3.

Onto a resistively heated, temperature-controlled carrier band 25, which band may be formed from stainless steel of 0.3 mm thickness, there is affixed a glueing sheet having a 50 μm thickness. A molding band 27 of about 50 μm thickness is affixed to the glueing sheet. The glueing sheet 26 electrically insulates the bands 25 and 27 from one another. However, the bands 25 and 27 are only partially thermally insulated from one another. The structure of FIG. 3 allows the molding band 27 to be heated by carrier belt 25 prior to entering the embossing zone, while at the same time allowing the molding band 27 to be cooled upon leaving the embossing zone. After the molding band is cooled and the thermostatic carrier separated therefrom, the molding band 27 is reheated by the carrier band 25.

Figure 4:
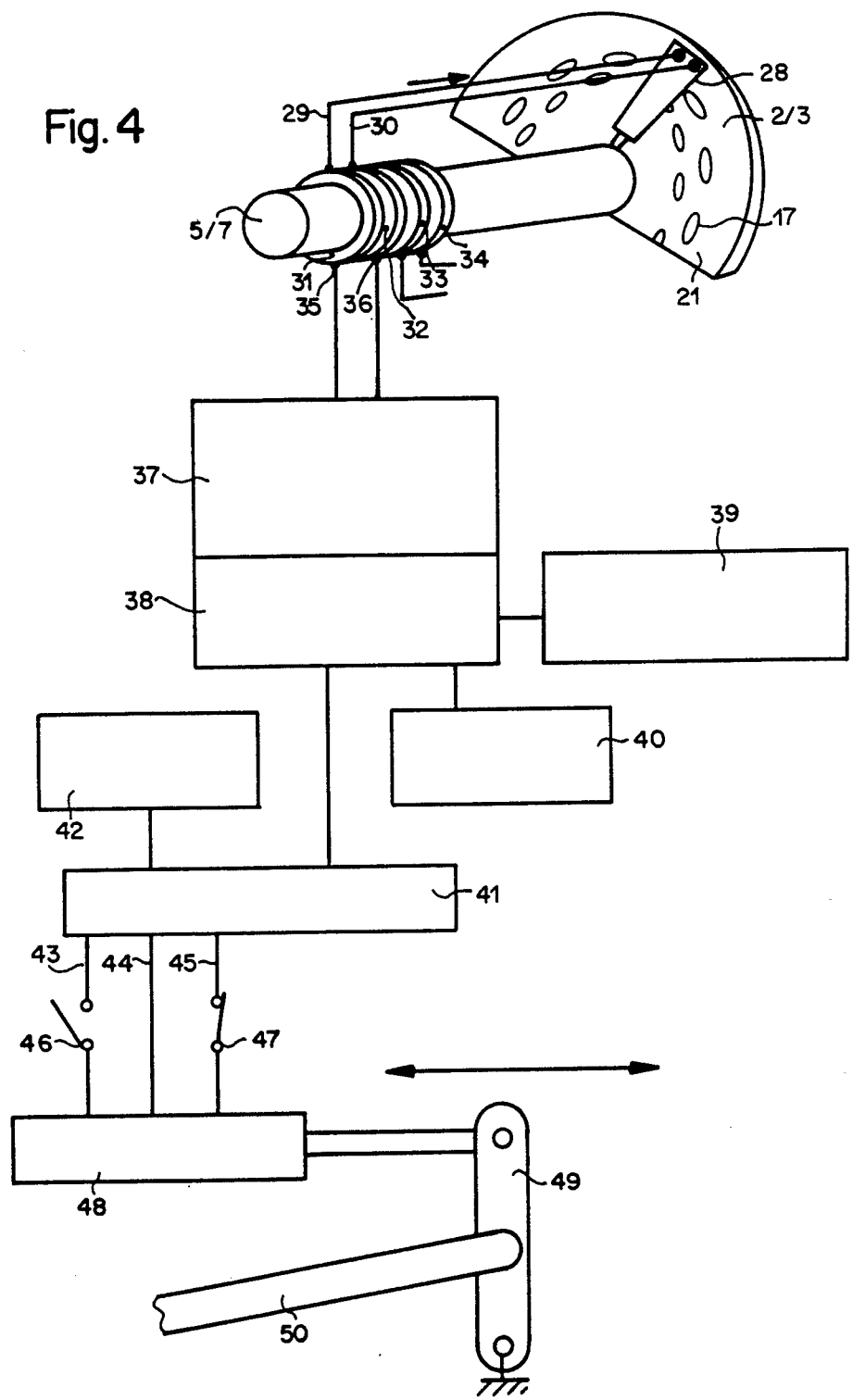
FIG. 4 schematically illustrates a system for controlling the embossing pressure of the apparatus of FIG. 1, in accordance with an illustrative embodiment of the invention.

In order to emboss high resolution relief patterns onto thermoplastic carriers with a minimum of distortion, it is desirable to be able to adjust the embossing pressure for optimum results. The apparatus of FIG. 1 is arranged so that the embossing pressure can be adjusted with ease in the cold state. Heating will considerably increase the embossing pressure by virtue of thermal expansion of the preheating disk 2 and of the mold disk 3. A system illustrated in FIG. 4 is provided for maintaining the embossing pressure at a desired value. The system of FIG. 4 may be used in connection with either of the disks 2 or 3. The system of FIG. 4 works by relating changes in disk radius to changes in embossing pressure.

FIG. 4 shows a preheating disk 2 or molding disk 3 provided with openings 17 wherein there has been arranged a conventional length-measuring sensor 28 for detecting changes in the distance between the axis of the disk and a fixed location near the circumference of the disk as the fixed location moves into and out of the emboss ing zone 100. This distance is at a minimum when the given location is under pressure in the embossing zone and at a maximum when there is no pressure exerted on the location. The difference between the maximum and minimum distances is generally proportional to the embossing pressure. The sensor 28 has starting lines 29 and 30, which lines are linked with the slide rings 31, 32 on the corresponding axis 5 or 7. The brushes 35, 36 slide on the rings 31, 32 and are connected to the inputs of a sample-and-hold circuit 37. The sample-and-hold circuit detects the minimum signal value outputted by the sensor 28 (corresponding to the minimum distance) and the maximum signal value outputted by the sensor 28 (corresponding to the maximum distance). A difference circuit 38 is connected to the circuit 37. The difference circuit 38 calculates the difference between the minimum and maximum signals outputted by the sensor 28, this difference being proportional to the actual embossing pressure. The difference circuit 38 is connected to a display 39 that indicates the maximum value of the distance. The difference circuit 38 is also connected to a display 40 that indicates the actual embossing pressure and to a control circuit 41 for controlling the embossing pressure. The control circuit 41 is also connected to the pressure instruction circuit 42 whose output signal corresponds to the desired embossing pressure. Three lines 43, 44 and 45 connect the control circuit 41 to a servo-motor 48. The servo-motor 48 activates an adjusting system comprised as an adjusting lever 49 and a connecting rod 50 linked thereto, which rod determines the distance between axes 5 and 7.

The output of the difference circuit 38, which corresponds to the actual embossing pressure, is transferred to the pressure control circuit 41 where this value is compared with the desired embossing pressure as indicated by the pressure-instruction circuit 42. Depending on the results of the comparison, the servo-motor 48 is activated in either one or the other direction over the lines 43, 45, which lines are provided with end switches 46, 47 respectively. The adjusting lever 49 is correspondingly activated, and by way of the rod 50 the distance between the axes 5 and 7 of FIG. 1, and thereby the pressure between the preheating disk 2 and the molding disk 3, is adjusted. The permissible end positions can be set by means of the adjustable end switches 46, 47.

Finally, the above described embodiments of the invention are intended to be illustrative only. Numerous alternative embodiments may be designed by those skilled in the art without departing from the spirit and scope of the following claims.

What is claimed is:

1. An apparatus for embossing a high resolution relief pattern onto a thermoplastic information carrier, said apparatus comprising:
   (a) first and second adjacent disks comprising a thermally and electrically insulating material and capable of being rotated about first and second adjacent axes in opposite senses, said first and second disks defining an embossing zone therebetween in which said disks are capable of exerting pressure on one another, said first disk being adapted to transport said thermoplastic information carrier to said embossing zone,
   (b) a metallic preheating band mounted under tension on said first disk for preheating said information carrier; and
   (c) a band-shaped embossing mold, said band-shaped embossing mold being mounted on said second disk; said first and second disks being adapted to rotate so that said information carrier and said embossing mold come into contact with one another in said embossing zone, the pressure exerted by said disks on one another in said embossing zone being sufficient to cause said relief pattern to be embossed onto said information carrier.

2. The apparatus of claim 1 wherein said preheating band and said band-shaped embossing mold are resistively heated by longitudinally flowing electric currents.

3. The apparatus of claim 1 wherein at least one of said first and second disks is semi-circular in shape.

4. The apparatus of claim 1 wherein at least one of said first and second disks is circular in shape.

5. The apparatus of claim 1 wherein one of said disks has at least one opening located close to its circumference.

6. The apparatus of claim 3 wherein said apparatus includes cylindrical support elements, said cylindrical support elements being mounted in slits located on the border of said first or second disks.

7. The apparatus of claim 1 wherein said first and second disks include first and second grooves, respectively, for receiving said preheating band and said band-shaped embossing mold, respectively.

8. The apparatus of claim 7 wherein said first and second grooves are lubricated.

9. The apparatus of claim 1 wherein said apparatus includes:
   at least one temperature sensor for sensing the temperature of said preheating band; and
   a temperature regulator coupled to said preheating band for maintaining the temperature of said preheating band at a predetermined value.

10. The apparatus of claim 1 wherein said apparatus includes a first rubber layer positioned between said first disk and said first axis and a second rubber layer positioned between said second disk and said second axis.

11. The apparatus of claim 1, wherein said preheating band is mounted to said first disk by means of an elastic layer glued to said first disk.

12. The apparatus of claim 1, wherein said band-shaped embossing mold comprises:
   a resistively heated carrier band; and a molding band which incorporates a mold of the relief pattern to be embossed, said carrier band and said molding band being separated by an insulating layer.

13. The apparatus of claim 1 wherein said first and second axes are coupled together by a pressure regulating device, said pressure regulating device being capable of controlling, the pressure exerted by said first and second disks on one another in said embossing zone.

14. The apparatus of claim 13 wherein said pressure regulating device comprises:
   (a) a distance measuring sensor for sensing the distance of a particular location near the circumference of one of said first or second disks from said first or second axis, respectively, and for producing an electrical output signal corresponding to said distance, said distance being at a minimum when said location is under maximal pressure in said embossing zone, said distance being at a maximum when said location is not under pressure;
   (b) circuit means for receiving said electrical output signal of said length measuring sensor and for producing a signal corresponding to the actual pressure in said embossing zone,
   (c) a pressure instruction circuit for producing a signal corresponding to a desired embossing pressure;
   (d) a comparator circuit for comparing said signal corresponding to said actual embossing pressure and said signal corresponding to said desired pressure, said comparator circuit being adapted to produce a servo-mechanism activation signal,
   (e) a servo-mechanism activated in response to said servo-mechanism activation signal for adjusting the distance between said first and second axes so that said pressure exerted by said disks on one another in the embossing zone is approximately equal to said desired pressure.

* * * * *